(12) United States Patent
Ookubo et al.

(10) Patent No.: US 7,815,322 B2
(45) Date of Patent: *Oct. 19, 2010

(54) ANTIGLARE LIGHT DIFFUSING MEMBER AND DISPLAY HAVING ANTIGLARE LIGHT DIFFUSING MEMBER

(75) Inventors: Toru Ookubo, Tokyo (JP); Tomo Yoshinari, Tokyo (JP); Kae Takahashi, Tokyo (JP); Jun Arao, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/495,511

(22) Filed: Jun. 30, 2009

(65) Prior Publication Data

US 2009/0262429 A1 Oct. 22, 2009

Related U.S. Application Data

(62) Division of application No. 11/653,808, filed on Jan. 12, 2007, now abandoned.

(30) Foreign Application Priority Data

Aug. 4, 2006 (JP) ............................. 2006-213020

(51) Int. Cl.
G02B 5/02 (2006.01)
G02B 27/00 (2006.01)

(52) U.S. Cl. ...................... 359/601; 359/599

(58) Field of Classification Search ................ 359/599, 359/601–613
See application file for complete search history.

(56) References Cited

U.S. PATENT DOCUMENTS

| | | | |
|---|---|---|---|
| 5,387,463 A | 2/1995 | Nakamura et al. | |
| 5,886,819 A | 3/1999 | Murata et al. | |
| 7,095,464 B2 | 8/2006 | Ito | |
| 7,538,947 B2 * | 5/2009 | Yoshinari et al. | 359/599 |
| 7,542,118 B2 * | 6/2009 | Miyauchi et al. | 349/137 |
| 7,628,496 B2 * | 12/2009 | Matsuura | 359/601 |
| 2004/0240070 A1 | 12/2004 | Suzuki et al. | |
| 2005/0152034 A1 * | 7/2005 | Matsunaga | 359/493 |
| 2005/0162743 A1 | 7/2005 | Yano et al. | |
| 2005/0207016 A1 * | 9/2005 | Ando | 359/586 |
| 2006/0216438 A1 * | 9/2006 | Nishimura et al. | 428/1.31 |

FOREIGN PATENT DOCUMENTS

| | | |
|---|---|---|
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |

(Continued)

OTHER PUBLICATIONS

Japanese Industrial Standard, "Surface roughness-Definitions and designation", Published by Japanese Standards Assoc. 28 pgs. (2001).

*Primary Examiner*—Thong Nguyen
(74) *Attorney, Agent, or Firm*—Squire, Sanders & Dempsey L.L.P.

(57) ABSTRACT

The purpose is to provide an antiglare light diffusing member that can satisfy both of external light reflection preventiveness and good contrast when being used for a display. The antiglare light diffusing member is made to be an antiglare light diffusing member having an antiglare light diffusing layer including a binder matrix and particles on a transparent base material, wherein the two types of arithmetical mean roughness (Ra1, Ra2) of the antiglare light diffusing layer defined by JIS-B0601-1994 are in the following range: Ra1 is in the range of 0.008-0.020 μm when cutoff wavelength λc is 0.008 mm; and Ra2 is less than 0.200 μm when cutoff wavelength λc is 0.8 mm.

12 Claims, 2 Drawing Sheets

FOREIGN PATENT DOCUMENTS

| | | |
|---|---|---|
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

* cited by examiner

ANTIGLARE LIGHT DIFFUSING MEMBER AND DISPLAY HAVING ANTIGLARE LIGHT DIFFUSING MEMBER

CROSS REFERENCE

This is a divisional of application Ser. No. 11/653,808, filed Jan. 12, 2007, now abandoned, which claims priority to Japanese application number 2006-213020, filed on Aug. 4, 2006, both of which are incorporated by reference.

BACKGROUND OF THE INVENTION

1. Field of the Invention

The present invention relates to an antiglare light diffusing member to be provided on the surface of a window, display etc. In particular, it relates to an antiglare light diffusing member to be provided on the surface of such displays as a liquid crystal display (LCD), cathode-ray tube (CRT) display, plasma display (PDP), organic electroluminescence display (ELD) and field effect display (FED, SED).

2. Description of the Related Art

Displays such as a liquid crystal display, CRT display, EL display and plasma display have some problems described below from the viewpoint of visibility.

External light reflects at looking and listening.

Surface glare (scintillation) occurs at the display surface by display light from the display.

Visibility is not good caused by dazzle of display light directly coming from the display without being diffused, etc.

Visibility is also degraded by such defect as unevenness of brightness.

In order to solve such lowering or degradation of visibility, it is known to arrange an antiglare light diffusing member on the front face of a display.

As an antiglare light diffusing member, for example, following techniques are known.

To arrange, on the surface of a display, an antiglare light diffusing member having an antiglare light diffusing layer having been subjected to embossing finish.

To arrange, on the surface of a display, an antiglare light diffusing member having an antiglare light diffusing layer on the surface of which is formed irregularity by mixing particles in a binder matrix.

In such antiglare light diffusing member, scattering phenomenon (surface diffusion) of light caused by surface irregularity is utilized.

Further, such antiglare light diffusing member is also known that, by mixing particles having a refraction index different from that of a binder matrix into the binder matrix, utilizes internal scattering (internal diffusion) of light based on the difference in refraction indices of the binder matrix and particles.

In an antiglare light diffusing member on the surface of which is formed irregularity through embossing finish, the surface irregularity thereof can be completely controlled. Consequently, reproducibility is good. However, when there is a defect or an adhered foreign substance on an emboss roll, endless defects occurs at the pitch of roll. Consequently, in the case of mass production, all the products have defect. Further, since the scattering only at the surface is utilized, there are following problems.

Abrasion resistance
Lowering of contrast
Occurrence of dazzling

An antiglare light diffusing member using a binder matrix and particles can be manufactured through a smaller number of processes than the antiglare light diffusing member using embossing finish. Accordingly, it can be manufactured inexpensively. Therefore, various embodiments of antiglare light diffusing member are known (Patent Document 1).

For example, following antiglare light diffusing members are known.

It is necessary to improve visibility by preventing reflection of external light, scintillation etc. Therefore, following methods have been considered.

To improve light scattering performance by making irregularity figure of the surface large.

To improve light scattering performance by increasing the amount of particles to be added.

However, there is such problem in the methods that the sharpness of a transmitted image is lowered.

As methods for improving the visibility etc. without lowering light scattering performance and the like, following techniques are known.

A technique in which binder matrix resin, spherical particles and amorphous particles are used in combination (Patent Document 2).

A technique in which binder matrix resin and plural particles having different particle sizes are used (Patent Document 3).

A technique including surface irregularity, wherein the cross-sectional area of the concave portion is defined (Patent Document 4).

In addition, in order to improve the visibility without lowering light scattering performance etc., there is also known such technique that uses scattering in an antiglare light diffusing member and scattering at the surface of antiglare light diffusing member in combination.

The scattering within an antiglare light diffusing member (internal diffusion) occurs by dispersing particles in a binder matrix such as resin of an antiglare light diffusing member, the particles having refraction index different from that of the binder matrix. In order to exert sufficient light diffusing performance, it is necessary to form a certain degree of surface irregularity on the surface of antiglare light diffusing member. However, there are following problems.

Lowering of contrast
Occurrence of dazzling caused by lens effect of the surface irregularity
Lowering of abrasion resistance The combined use of internal scattering and surface scattering leads to smaller surface irregularity compared with an antiglare light diffusing member using surface scattering alone. Therefore, there are following advantages.

Improvement of contrast
Reduction of dazzling caused by lens effect of the surface irregularity
Improvement of abrasion resistance For example, as the technique using internal scattering and surface scattering in combination, following techniques are known.

A technique wherein the internal haze (cloudiness) is 1-15%, and the surface haze (cloudiness) is 1-15% (Patent Documents 5, 6).

A technique wherein, while using binder resin and particles having the particle size of 0.5-5 µm, the difference in refraction indices of the resin and the particle is 0.02-0.2 (Patent Document 7).

A technique wherein, while using binder resin and particles having the particle size of 1-5 µm, the difference in refraction indices of the resin and the particle is 0.05-0.15. Further, techniques defining a solvent to be used, surface roughness etc. (Patent Documents 8, 9, 10, 11, 12).

A technique wherein, using binder resin and plural types of particles, the difference in refraction indices of the resin and the particle is 0.03-0.2 (Patent Documents 13, 14).

There are also known following techniques that reduce lowering of contrast, hue variation etc. when a viewing angle is altered.

In the technique, the surface haze (cloudiness) is 3 or more. Further, the difference between the haze value in the direction of normal line and the haze value in the direction of ±60° is 4 or less (Patent Documents 15, 16, 17, 18). A technique wherein center line average roughness (Ra) is 0.2 µm or less is also known (Patent Document 19). A technique wherein the center line average roughness (Ra) is 0.02-1 µm, and the ten point average roughness (Rz)/Ra is 30 or less is also known (Patent Document 20, 21).

Since an antiglare light diffusing member is mainly arranged on the front face of a display, abrasion resistance is required. In order to improve the abrasion resistance, it is necessary to improve the hardness of an antiglare light diffusing member. Therefore, there is known such technique as using an ionizing radiation-curing resin binder, silica particles and silicone particles in order to manufacture an antiglare light diffusing member having a high hardness without lowering the display image quality of a display (Patent Document 21).

As described above, there are disclosed antiglare light diffusing members of various constitutions for various purposes.

The performance required for an antiglare light diffusing member differs depending on displays when it is used on the front face of a display. For example, the optimum antiglare light diffusing member differs depending on the resolving power of a display, intended purpose etc. A broad range of antiglare light diffusing members are required according to intended purposes.

Incidentally, an important purpose of the antiglare light diffusing member is to prevent reflection of external light by means of surface diffusion. However, when it is intended to improve reflection preventiveness by making the surface irregularity rough, contrast is lowered.

The invention was accomplished while taking this problem into consideration, and aims to provide an antiglare light diffusing member that can satisfy both of the external light reflection preventiveness and good contrast when it is used for a display.

In addition, the invention aims to allow the antiglare light diffusing member to have a high hardness.

[Patent Document 1] U.S. Pat. No. 5,387,463
[Patent Document 2] JP-A-2003-260748
[Patent Document 3] JP-A-2004-004777
[Patent Document 4] JP-A-2003-004903
[Patent Document 5] Japanese Patent No. 3507719
[Patent Document 6] U.S. Pat. No. 6,343,865
[Patent Document 7] JP-A-11-326608
[Patent Document 8] Japanese Patent No. 3515426
[Patent Document 9] U.S. Pat. No. 6,696,140
[Patent Document 10] U.S. Pat. No. 7,033,638
[Patent Document 11] US Patent Published Application No. 2002-0150722
[Patent Document 12] US Patent Published Application No. 2004-0150874
[Patent Document 13] Japanese Patent No. 3515401
[Patent Document 14] U.S. Pat. No. 6,217,176
[Patent Document 15] JP-A-11-160505
[Patent Document 16] U.S. Pat. No. 6,111,699
[Patent Document 17] U.S. Pat. No. 6,327,088
[Patent Document 18] U.S. Pat. No. 6,480,249
[Patent Document 19] JP-A-2003-149413
[Patent Document 20] JP-A-2004-125958
[Patent Document 21] JP-A-2004-082613
[Patent Document 22] US Patent Published Application No. 2004-0071986

SUMMARY OF THE INVENTION

The present invention aims to provide an antiglare light diffusing member that can satisfy both of the external light reflection preventiveness and good contrast when it is used for a display. The antiglare light diffusing member is formed to be an antiglare light diffusing member having an antiglare light diffusing layer including a binder matrix and particles on a transparent base material, wherein the two types of arithmetical mean roughness (Ra1, Ra2) of the antiglare light diffusing layer defined by JIS-B0601-1994 are in the following range:

Ra1 is in the range of 0.008-0.020 µm when cutoff wavelength λc is 0.008 mm; and Ra2 is less than 0.200 µm when cutoff wavelength λc is 0.8 mm.

DESCRIPTION OF REFERENCE NUMERALS

Figure 1:
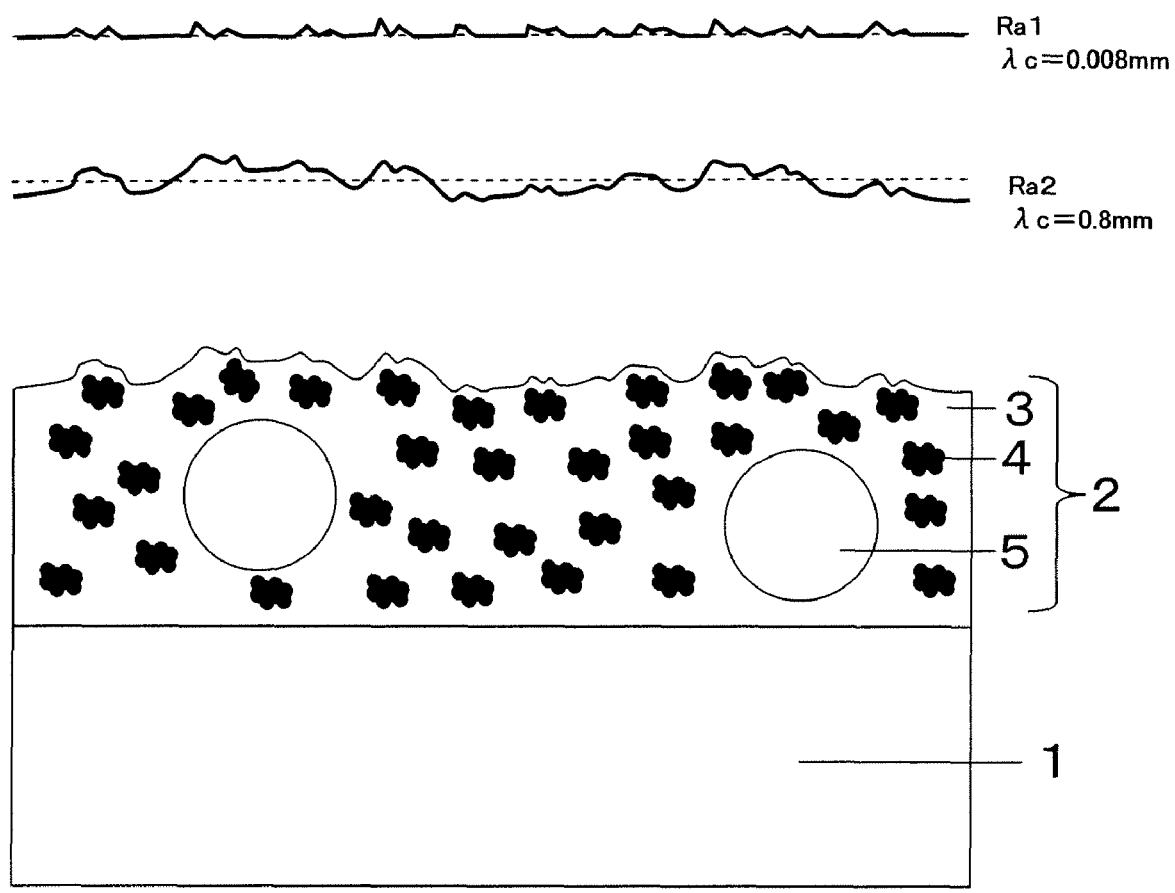
FIG. 1 A cross-sectional view showing an example of the antiglare light diffusing member of the present invention.
Figure 2:
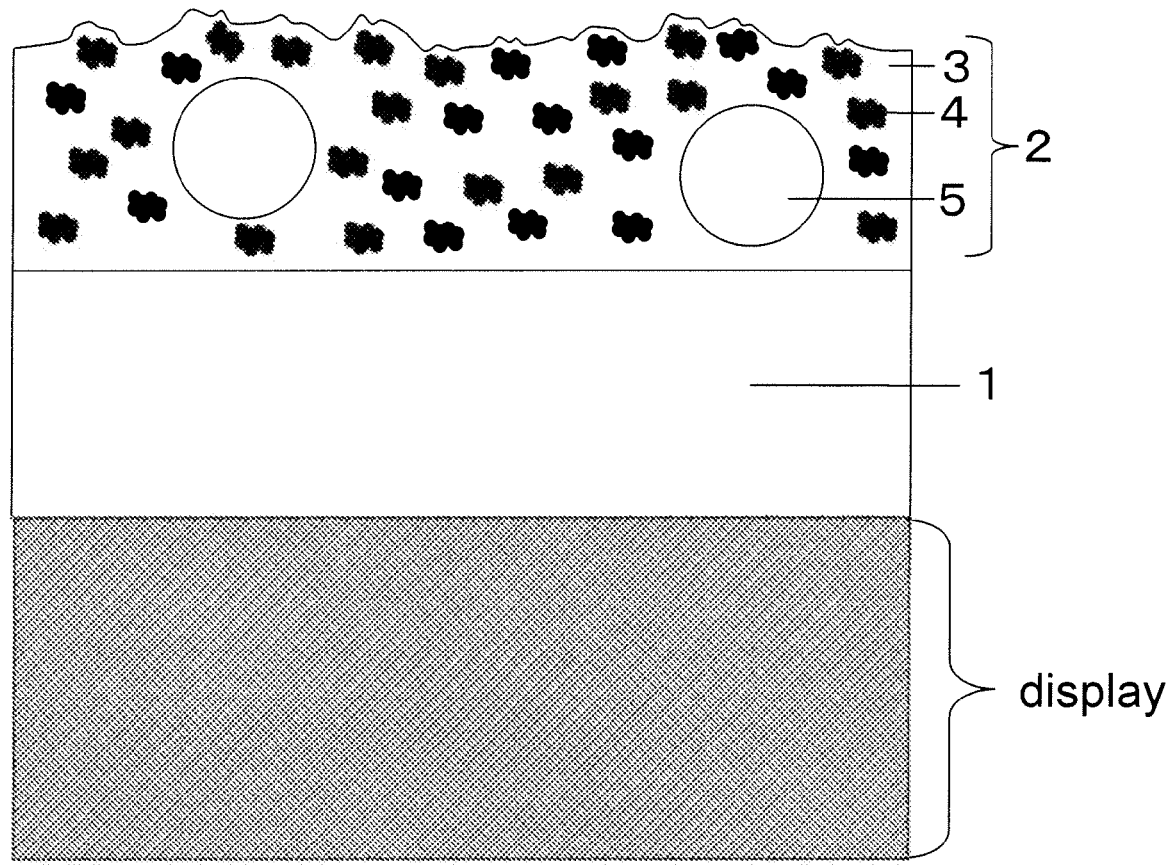
FIG. 2 A cross-sectional view showing an example of a display having the antiglare light diffusing member of the present invention.

1 . . . Base material
2 . . . Antiglare light diffusing layer
3 . . . Binder matrix
4 . . . Particle A
5 . . . Particle B

DESCRIPTION OF THE PREFERRED EMBODIMENTS

In the antiglare light diffusing member of the present invention, an antiglare light diffusing layer including a binder matrix and particles is formed on a base material.

And two types of the artificial mean roughness (Ra1, Ra2) of the antiglare light diffusing layer defined by JIS-B0601-1994 (JIS: Japanese Industrial Standard) are respectively in the following ranges:

an arithmetical mean roughness (Ra1) in the case where a cutoff value λc is 0.008 mm is in the range of 0.008-0.020 µm; and an arithmetical mean roughness (Ra2) in the case where a cutoff value λc is 0.8 mm is less than 0.200 µm.

Ra1 is an arithmetical mean roughness obtained from a roughness curve with a cutoff value (λc) of 0.008 mm. Ra2 is an arithmetical mean roughness obtained from a roughness curve with a cutoff value (λc) of 0.8 mm.

The λc is a cutoff value when a roughness curve is obtained from a profile curve in the evaluation of the surface roughness. That is, the λc is a parameter that determines a wavelength range in which surface irregularity components is eliminated from the profile curve. Various types of surface profile parameters such as Ra varies depending on the λc. A smaller λc gives a roughness curve that reflects more components with a shorter wavelength. Accordingly, a smaller λc gives various types of surface profile parameters that reflect finer irregularity components.

When an Ra1 is less than 0.008 μm, the external light reflection preventiveness are not sufficiently expressed. On the other hand, when an Ra1 is more than 0.020 μm, the contrast is lowered significantly. That is, it is more preferable that Ra1 is from 0.008 μm to 0.020 μm.

In addition, when an Ra2 is 0.2 μm or more, the transmission sharpness and abrasion resistance are lowered.

A ten point average roughness Rz on the antiglare light diffusing layer surface is preferably 0.5-1.5 μm. An average irregularity distance Sm is preferably 0.1-0.3 mm.

When the irregularity figure of the antiglare light diffusing layer surface is made rough, the external light reflection preventiveness is improved. However, the image sharpness and abrasion resistance are lowered. In addition, the separation of a particle occurs. When the ten point average roughness Rz and average irregularity distance Sm are in the above-described range, an antiglare light diffusing layer satisfies all of the external light reflection preventiveness, image sharpness and abrasion resistance. In addition, the separation of a particle is few.

The ten point average roughness Rz and average irregularity distance Sm can be measured according to the definition of JIS-B0601-1994 (JIS: Japanese Industrial Standard).

As the base material for use in the antiglare light diffusing member of the invention, glass, a plastic film etc. can be used. It suffices that the plastic film has a proper degree of transparency and mechanical strength. For example, such films as polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used.

When the antiglare light diffusing member is used on the front face of a liquid crystal display etc., triacetylcellulose (TAC) is used preferably because it does not show optical anisotropy.

Further, a polarizing plate may be used as the base material. There is no particular limitation on a polarizing plate to be used. For example, such polarizing plate can be used that has a stretched polyvinyl alcohol (PVA) added with iodine as a polarizing layer between a pair of triacetylcellulose (TAC) films. A polarizing plate composed of a TAC film and a stretched PVA added with iodine has a high polarization degree and can be used suitably for a liquid crystal display etc. In this case, an antiglare light diffusing layer can be provided on one of triacetylcellulose (TAC) films.

From the viewpoint of optical property, mechanical strength, handleability etc., the thickness of the base material is preferably 10-500 μm.

To the base material, an additive may be added. Examples of the additive include an ultraviolet absorber, infrared absorber, antistatic agent, refraction index-adjusting agent and reinforcing agent.

The antiglare light diffusing layer includes a binder matrix, the particle A and the particle B. The thickness of the antiglare light diffusing layer is preferably 5-20 μm. In this case, the antiglare light diffusing layer has a sufficient hardness, and is also excellent in handleability.

For the binder matrix for use in the antiglare light diffusing layer, following properties are required.

When a film is formed using the binder matrix, the film has proper degree of transparency and mechanical strength.

Added particles are dispersed in the binder matrix.

For example, ionizing radiation-curable resin such as ultraviolet ray-curable resin and electron beam-curable resin, heat-curable resin, thermoplastic resin, and an inorganic or organic-inorganic composite matrix obtained by hydrolyzing and dehydration-condensing metal alkoxide can be used.

Examples of the heat-curable resin include heat curable type urethane resin composed of acrylic polyol and isocyanate prepolymer, phenol resin, urea-melamine resin, epoxy resin, unsaturated polyester resin and silicone resin.

Examples of the ionizing radiation-curable resin include polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid. In addition to these, polyether resin having an acrylate-based functional group, polyester resin, epoxy resin, alkyd resin, spiroacetal resin, polybutadiene resin, polythiolpolyene resin can be also used.

Among the ionizing radiation-curable resin, when ultraviolet ray-curable resin is used, a photopolymerization initiator is added. Any photopolymerization initiator may be usable, but the use of one suitable for a resin to be used is preferred.

As the photopolymerization initiator (radical polymerization initiator), benzoin and alkyl ethers thereof such as benzoin, benzoinmethylether, benzoinethylether, benzoinisopropylether and benzylmethylketal are used. The use amount of the photosensitizing agent is 0.5-20 wt %, preferably 1-5 wt % relative to the resin.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin.

Examples of the usable inorganic or organic-inorganic composite matrix include materials using silicon oxide-based matrix employing a silicon alcoxide-based material as a starting material.

When the base material is made of a plastic film, in order to supply mechanical strength, a binder matrix having a high hardness is preferably used. Specifically, resin having a high hardness, and inorganic or organic-inorganic composite matrix obtained by hydrolyzing and dehydration-condensing metal alkoxide can be used. In particular, when using a plastic film having a thickness of 100 μm or less, the use of a binder matrix having a high hardness is preferred.

In particular, the use of ionizing radiation-curable resin such as ultraviolet ray-curable resin and electron beam-curable resin is preferred. The use of ionizing radiation-curable resin makes it possible to manufacture an antiglare light diffusing layer having a certain degree of flexibility, no crack and high hardness.

The antiglare light diffusing layer preferably has a surface hardness of 3H or more in the pencil hardness according to JIS K5400. More preferably it has 4H or more.

Here, the refraction index of a binder matrix means the refraction index of the film after forming a film with the binder matrix. That is, when curable resin is used, it means the refraction index of the film after forming a film by curing.

In addition, the refraction index is a value measured for a film of binder matrix prepared without including after-mentioned particles as a sample for measurement.

The particle included in an antiglare light diffusing layer is used for forming the surface irregularity of the antiglare light diffusing layer.

As the particle to be used, those that result in the arithmetical mean roughness in the above-mentioned range in a case the antiglare light diffusing layer is formed can be used.

For example, organic particles and inorganic particles having an average particle size of around 0.5-10 μm can be used. Examples of such organic particles include acrylic particle, acrylic-styrene particle, melamine particle and polycarbonate particle. Examples of such inorganic particles include silica particle, talc particle, aluminosilicate particle, kaolin clay particle, MgAl hydrotalcite particle, feldspar, bentonite and zeolite.

The particle size means an average particle size of particles. A value measured by a light scattering method can be used as the particle size. The light scattering method will be described below. A sample liquid containing particles is prepared. The sample liquid is measured with a particle size distribution measuring apparatus of a light scattering system. The sample liquid containing particles is prepared so that no aggregation occurs. For the purpose, suitably, the sample liquid is diluted by a diluent in accordance with the type etc. of particles.

Further, the use of particles whose standard deviation of particle size is 40% or less of the average particle size is preferred. The standard deviation can be calculated from the particle size distribution obtained in volume frequency with the particle size distribution measuring apparatus.

When it is actually used as an antiglare light diffusing member, by using both of the diffusion at the surface and the inside diffusion, following effects are exerted.

To prevent reflection of external light

To lower surface glare (scintillation)

In this case, it is necessary to set the surface diffusion and the internal diffusion in an intended range. And further, it is necessary to set the arithmetical mean roughness in the above-described range. However, the control of these values is difficult.

Therefore, the use of two or more types of particles is preferred.

In the invention, it is preferred to include at least two types of particles of a particle A and a particle B. The particle A is added to create the surface diffusion. The particle B is added to create the internal diffusion.

The difference between the refraction index of the particle A and the refraction index of the binder matrix is preferably 0.07 or less. When the indices are out of this range, an antiglare layer tends to be whitened caused by unnecessary internal diffusion.

The particle A preferably has an average particle size of 0.5-10 μm. An average particle size of less than 0.5 μm makes it difficult to form irregularity as large as generating light scattering phenomenon on the surface of an antiglare light diffusing layer. When an average particle size is more than 10 μm, the transmission sharpness is lowered.

The particle size means an average particle size of particles. A value measured by a light scattering method or a Coulter counter method can be used as the particle size. The light scattering method will be described below. A sample liquid containing particles is prepared. The sample liquid is measured with a particle size distribution measuring apparatus of a light scattering system. The sample liquid containing particles is prepared so that no aggregation occurs. For the purpose, suitably, the sample liquid is diluted by a diluent in accordance with the type etc. of particles.

Further, the use of particles whose standard deviation of particle size is 40% or less of the average particle size is preferred. The standard deviation can be calculated from the particle size distribution obtained in volume frequency with the particle size distribution measuring apparatus.

The content of the particle A relative to the antiglare light diffusing layer is preferably 10-30 wt %, further preferably 15-25 wt %. A content of less than 10 wt % does not allow sufficient light diffusing performance to be expressed. A content of more than 30 wt % significantly lowers the contrast.

As the particle A, various types of such inorganic particles can be used as silica, calcium carbonate, aluminum hydroxide, magnesium oxide, kaolin clay, feldspar, talc, bentonite and various types of zeolite. The surface of the particle preferably has been subjected to a hydrophobic treatment from the viewpoint of dispersibility. In addition, inorganic particles other than these inorganic particles, which satisfy the above conditions, can also be used.

The figure of the particle is preferably amorphous. A preferable configuration of the amorphous particle is an aggregate of primary particles. The primary particle size is preferably 0.003 μm-0.1 μm. The secondary particle size is preferably 0.5-2.5 μm. The respective particle sizes of the above values make it possible to satisfy both of the antiglare property and transmission sharpness.

As the particle, aforementioned particles can be used. A silica aggregate is particularly preferred. Silica aggregates synthesized by such wet processes as a precipitation method and a gel method can be available as commercial products.

The difference between the refraction index of the particle B and the refraction index of the binder matrix is preferably 0.02-0.15, further preferably 0.05-0.08. When the difference between the refraction indices is less than 0.02, the internal diffusion is insufficient. Therefore, dazzling is noticeable. When the difference between the refraction indices is more than 0.15, the antiglare layer tends to be whitened.

The particle B preferably has an average particle size of 2-10 μm. When an average particle size is less than 2 μm, the dazzling is not sufficiently suppressed. When an average particle size is more than 10 μm, the variation of internal diffusion becomes problematic.

The particle size means an average particle size of particles. A value measured by a light scattering method or a Coulter counter method can be used as the particle size. The light scattering method will be described below. A sample liquid containing particles is prepared. The sample liquid is measured with a particle size distribution measuring apparatus of a light scattering system. The sample liquid containing particles is prepared so that no aggregation occurs. For the purpose, suitably, the sample liquid is diluted by a diluent in accordance with the type etc. of particles.

Examples usable for such particle B include a styrene particle (refraction index 1.59), acrylic styrene particle (refraction index 1.58), polycarbonate particle (refraction index 1.58) and melamine particle (refraction index 1.66).

The particle B preferably has a spherical shape. When the antiglare light diffusing layer is used for a display, the spherical particle B results in a small lowering of front luminance of light emitted from the display caused by the internal diffusion. Further, the lowering of contrast of display material is also small.

The spherical particle includes a perfect spherical particle and ellipse-sphere, and further, particles formed continuously by spherical surfaces.

The particle B is further preferably in the monodispersion state. In the case of monodispersion, the lowering of front luminance becomes further small.

Specifically, the use of particles, whose standard deviation of the particle size is 15% or less of the average particle size, is preferred.

The standard deviation can be calculated from the particle size distribution obtained in volume frequency with the aforementioned particle size distribution measuring apparatus.

As the spherical particle, resin particles are preferred. For example, the aforementioned styrene particle, acrylic styrene particle, polycarbonate particle and melamine particle can be used.

The content of the particle B in an antiglare light diffusing layer is preferably 2-15 wt %. A content of less than 2 wt % does not sufficiently suppress dazzling. A content of more than 15 wt % lowers the front luminance.

Each of the particle A and the particle B may be used independently. Two types or more of the particle A and the particle B, respectively, may be used. When two types or more of the particle A and the particle B are used respectively, they must be able to control the surface diffusion and internal diffusion.

The antiglare light diffusing layer of the invention preferably has a surface haze value of 1-15%, and an internal haze value of 15-50%. A surface haze value of less than 1% results in insufficient external light reflection preventiveness. When a surface haze value is more than 15%, contrast or abrasion resistance becomes troublesome. On the other hand, an internal haze value of less than 15% results in noticeable dazzling. When an internal haze value is more than 50%, the front luminance lowers.

The surface scattering and the internal scattering are controlled so that the surface haze value and the internal haze value fall in the above-described range. As the result, the antiglare light diffusing layer of the invention can be used for a high-resolution display, displays for use in a room or automobile, etc. Further, the antiglare light diffusing layer of the invention can be used for various applications.

To the binder matrix, other functional additives may be added. But, other functional additives must not affect transparency, light diffuseness etc.

Examples of the usable functional additive include an antistatic agent, ultraviolet absorber, infrared absorber, refraction index-adjusting agent, adhesiveness-improving agent and curing agent.

A method for manufacturing the antiglare light diffusing layer is described below. A light diffusing coating liquid containing a starting material of the binder matrix and the aforementioned particles is coated to the base material. Then, the coating liquid is dried or cured. Thus, the antiglare light diffusing layer can be obtained.

The coating liquid may contain a solvent according to need.

The solvent must be able to disperse the starting material of the binder matrix, the particle A and the particle B. Further, the solvent is required to be provided with coating aptitude. For example, toluene, cyclohexanone, ethylcellosolve, ethylacetate, butylacetate, methyl isobutyl ketone and isopropanol can be used.

The amount of the solvent is not particularly limited.

A coating method using a roll coater, a reverse roll coater, a gravure coater, a knife coater, a bar coater or a slot die coater can be used.

The solid content concentration of the coating liquid differs depending on a coating method. The solid content concentration may be around 30-70 wt % in weight ratio.

A case where a curable resin is used will be described. The above-described coating liquid is coated on the base material. Then, by applying external energy such as ultraviolet rays, electron beams or heat to the coated layer, the coated layer is cured. Thus, the antiglare light diffusing layer is formed.

In the case of ultraviolet curing, such light source as a high-pressure mercury lamp, a low-pressure mercury lamp, an ultrahigh-pressure mercury lamp, a metal halide lamp, a carbon arc lamp and a xenon arc lamp can be utilized.

In the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

Before and after the curing process, a drying process may be provided. The curing and drying may be effected simultaneously.

Examples of drying means include heating, air blowing and hot air blowing.

A method for forming the antiglare light diffusing layer using a thermoplastic binder matrix will be described below. The coating liquid is coated on the base material. Then, the coated layer is dried. Thus the antiglare light diffusing layer is formed. Examples of drying means include heating, air blowing and hot air blowing.

A method for forming the antiglare light diffusing layer using an inorganic or organic-inorganic composite matrix will be described below. The coating liquid is coated on the base material. Then, by applying external energy such as ultraviolet rays, electron beams or heat, the coated layer is cured. Thus, the antiglare light diffusing layer is formed.

Before and after the curing process, a drying process may be provided. The curing and drying may be effected simultaneously.

Examples of drying means include heating, air blowing and hot air blowing.

When a polarizing plate having a polarizing layer between a pair of supports for the polarizing layer is used as a base material, a method for manufacturing the antiglare light diffusing member will be described below.

First, on a first support for the polarizing layer, the antiglare light diffusing layer is provided by a method similar to the method described above.

Next, on the side of the first support for the polarizing layer facing to the side provided with the antiglare light diffusing layer, a polarizing layer is provided. When the polarizing plate is composed of a TAC film and stretched PVA film added with iodine, the stretched PVA film added with iodine is laminated while being stretched on the support for the polarizing layer to provide the polarizing layer.

Next, a second support for the polarizing layer is provided on the polarizing layer.

Another method for manufacturing the antiglare light diffusing member will be described below.

First, a polarizing plate having a polarizing layer between a pair of supports for the polarizing layer is prepared. Then, the antiglare light diffusing layer is provided on one of the supports for the polarizing layer.

The antiglare light diffusing layer of the invention may further have an antireflection layer, a water-repelling layer, an antifouling layer etc. In addition, a primer layer or a adhesion layer may be provided in order to improve the adhesiveness between the transparent base material and the antiglare light diffusing layer, or to improve the adhesiveness between respective layers.

The antiglare light diffusing member of the invention can be applied to the front plate of various types of displays such as LCD, CRT, ELD, PDP, FED and SED.

According to the invention, the antiglare light diffusing member that satisfies both of the external light reflection preventiveness and good contrast can be obtained. In addition, the antiglare light diffusing member having a sufficient surface hardness for a display can be obtained.

Hereinafter, Examples and Comparative Examples are shown.

A measuring method of the refraction index of a binder matrix used in Examples and Comparative Examples is described below. A coating liquid similar to that described above was prepared. But, no particle was contained in the coating liquid. The coating liquid was coated, dried and cured according to a method similar to that described above. The refraction index of thus obtained layer was measured. A digital refractometer Rx2000 (manufactured by ATAGO CO., LTD.) was used, and the refraction index was measured according to the light refraction critical angle-detecting system.

The refraction index of the particle was measured according to the Becke line-detecting method (immersion method).

A primary particle size of silica particles was measured by a TEM. An average particle size of silica particles was measured by the Coulter counter method. Average particle sizes of other particles were measured using a particle size distribution measuring apparatus of a light scattering system (SALD-7000, manufactured by Shimadzu Corporation).

Example 1

A triacetylcellulose film (TD-80U, manufactured by Fuji Photo Film Co., LTD.; refraction index 1.49, film thickness 80 μm) was used as a base material. On the base material, an antiglare light scattering coating liquid having the composition shown in Table 1 was coated with a slot die coater. Then, a solvent included in the coating liquid was evaporated. Then, the antiglare light scattering layer was cured through ultraviolet irradiation of 400 mJ using a high-pressure mercury lamp under an atmosphere of 0.03% or less of oxygen concentration. The dried antiglare light scattering layer had a thickness of 5.0 μm. Thus, a sample was prepared.

Example 2

An antiglare light scattering coating liquid having the composition shown in Table 1 was used. An antiglare light scattering layer was prepared in the same way as in Example 1 except for the type of the antiglare light scattering coating liquid.

The refraction index of the binder matrix, refraction index of the particle and average particle size of the particle were measured in the same way as in Example 1.

Example 3

An antiglare light scattering coating liquid having the composition shown in Table 1 was used. An antiglare light scattering layer was prepared in the same way as in Example 1 except for the type of the antiglare light scattering coating liquid.

The refraction index of the binder matrix, refraction index of the particle and average particle size of the particle were measured in the same way as in Example 1.

Comparative Example 1

An antiglare light scattering coating liquid having the composition shown in Table 1 was used. An antiglare light scattering layer was prepared in the same way as in Example 1 except for the type of the antiglare light scattering coating liquid.

The refraction index of the binder matrix, refraction index of the particle and average particle size of the particle were measured in the same way as in Example 1.

Comparative Example 2

An antiglare light scattering coating liquid having the composition shown in Table 1 was used. An antiglare light scattering layer was prepared in the same way as in Example 1 except for the type of the antiglare light scattering coating liquid.

The refraction index of the binder matrix, refraction index of the particle and average particle size of the particle were measured in the same way as in Example 1.

TABLE 1

|  | Ingredient | Material name | Refraction index | Particle size | Content (weight part) |
|---|---|---|---|---|---|
| Example 1 | binder | binder 1 | 1.53 (after curing) | | 100 |
| | particle A | particle 1 | 1.47 | primary particle size 0.02 μm secondary particle size 1.1 μm | 26 |
| | particle B | particle 2 | 1.59 | particle size 3.5 μm | 6.6 |
| | ultraviolet polymerization initiator | material 1 | | | 5.3 |
| | | toluene | | | 138 |
| Example 2 | binder | binder 1 | 1.53 (after curing) | | 100 |
| | particle A | particle 1 | 1.47 | primary particle size 0.02 μm secondary particle size 1.1 μm | 15 |
| | particle B | particle 2 | 1.59 | particle size 3.5 μm | 15 |
| | ultraviolet polymerization initiator | material 1 | | | 5.3 |
| | | toluene | | | 138 |

TABLE 1-continued

| | Ingredient | Material name | Refraction index | Particle size | Content (weight part) |
|---|---|---|---|---|---|
| Example 3 | binder | binder 1 | 1.53 (after curing) | | 100 |
| | particle A | particle 1 | 1.47 | primary particle size 0.02 μm secondary particle size 1.1 μm | 45 |
| | particle B | none | | | |
| | ultraviolet polymerization initiator | material 1 | | | 5.3 |
| | | toluene | | | 150 |
| Comp. EX. 1 | binder | binder 1 | 1.53 (after curing) | | 100 |
| | particle A | particle 3 | 1.47 | primary particle size 0.02 μm secondary particle size 2.0 μm | 20 |
| | particle B | none | | | |
| | ultraviolet polymerization initiator | material 1 | | | 5 |
| | | toluene | | | 125 |
| Comp. EX. 2 | binder | binder 1 | 1.53 (after curing) | | 100 |
| | particle A | particle 4 | 1.49 | particle size 3.0 μm | 4 |
| | particle B | none | | | |
| | ultraviolet polymerization initiator | material 1 | | | 5 |
| | | toluene | | | 109 |

In the above Table,

Binder 1: pentaerythritol triacrylate (PE-3A, manufactured by KYOEISHA CHEMICAL Co., LTD.), Particle 1: silica particle (SS50F, manufactured by TOSOH•SILICA), Particle 2: styrene beads (SX-350H, manufactured by Soken Chemical & Engineering Co., Ltd.), Particle 3: silica particle (SS50B, manufactured by TOSOH•SILICA), Particle 4: acrylic beads (MX-300, manufactured by Soken Chemical & Engineering Co., Ltd.), and Material 1: Irgacure 184 (manufactured by Ciba Specialty Chemicals).

<Evaluation>

The arithmetical mean roughness, internal haze, surface haze and pencil hardness were measured for the samples obtained in Examples and Comparative Examples. The results are shown in Table 2. Also, evaluations of reflection property of external light, contrast and sharpness of a transmitted image are shown in Table 2.

<Arithmetical Mean Roughness>

Ra1 (λc: 0.008 mm) and Ra2 (λc: 0.8 mm) were measured using a high accuracy micro figure measuring instrument (SURF CORDER ET4000A, manufactured by Kosaka Laboratory Ltd.) on the basis of JIS-B0601-1994 (evaluation length=0.8 mm, scanning rate=0.005 mm/sec).

<Reflection Property of External Light>

Respective samples were laminated to respective black plastic plates and, in that state, the reflection of fluorescent light was evaluated visually. The judgment standard is shown below.

○: reflection is indistinctive
x: reflection is recognized remarkably

<Contrast>

By using an adhesive, respective samples were laminated to respective LCD panels of which surface were not processed. In the state where the LCD panel with a sample was installed in a room of 300 lux, a contrast of a display image was checked by eye observation.

Judgmental standard is as follows:

⊚ . . . very good;

○ . . . good (in a black part of a display image, a little white blur is caused); and x . . . bad in visibility (in a black part of a display image, a white blur is caused).

<Transmission Sharpness>

The transmission sharpness of respective samples was measured using an image clarity meter (ICM-1DP, manufactured by SUGA TEST INSTRUMENTS) according to JIS K7105. Measurement values obtained by using four types of optical combs (0.125 mm, 0.5 mm, 1.0 mm, 2.0 mm) were added to give the measurement value. The judgment standard of transmission sharpness is shown bellow.

○: 150 or more
x: less than 150

<Measuring Method of Haze>

The haze was measured using a haze meter (NDH2000, NIPPON DENSHOKU) according to JIS K7105. The antiglare light scattering layer was flattened by pasting a transparent adhesive on the surface of the antiglare light scattering layer. The haze of the sample in which the contribution of surface diffusion had been eliminated was determined to be the internal haze. The surface haze was determined as a value obtained by subtracting the internal haze from the total haze.

<Measuring Method of Pencil Hardness>

The pencil hardness was measured according to JIS K5400.

TABLE 2

|  | Arithmetical mean roughness | | Reflection property | Contrast | Sharpness of transmitted image | Surface haze (%) | Internal haze (%) | Pencil hardness |
| --- | --- | --- | --- | --- | --- | --- | --- | --- |
|  | Ra1 | Ra2 |  |  |  |  |  |  |
| Example 1 | 0.011 μm | 0.096 μm | ○ | ◎ | ○ | 7.1 | 18.2 | 3H |
| Example 2 | 0.009 μm | 0.150 μm | ○ | ◎ | ○ | 4.3 | 41.5 | 3H |
| Example 3 | 0.017 μm | 0.155 μm | ○ | ○ | ○ | 11.8 | 2.5 | 3H |
| Comp. Ex. 1 | 0.029 μm | 0.446 μm | ○ | X | X | 21.0 | 4.1 | 3H |
| Comp. Ex. 2 | 0.004 μm | 0.182 μm | X | ○ | X | 4.7 | 0.5 | 3H |

Samples according to Examples were excellent in the reflection preventiveness, contrast and sharpness of a transmitted image. On the contrary, samples according to Comparative Examples could satisfy not all of these.

What is claimed is:

1. An antiglare light diffusing member comprising an antiglare light diffusing layer comprising a binder matrix and a particle on a transparent base material,
    wherein the two types of arithmetical mean roughness (Ra1, Ra2) of the antiglare light diffusing layer defined by JIS-B0601-1994 are respectively in the following ranges:
    an arithmetical mean roughness (Ra1) in the case where a cutoff value (λc) is 0.008 mm is in the range of 0.008-0.020 μm; and
    an arithmetical mean roughness (Ra2) in the case where a cutoff value (λc) is 0.8 mm is less than 0.200 μm, and
    wherein the particle is composed of a plurality of types of particles
    and
    wherein the antiglare light diffusing layer surface has ten point average roughness (Rz) defined by JIS-B0601-1994 of 0.5-1.5 μm and average irregularity distance (Sm) defined by JIS-B0601-1994 of 0.1-0.3 mm.

2. The antiglare light diffusing member according to claim 1 wherein the antiglare light diffusing layer has a thickness of 5-20 μm.

3. The antiglare light diffusing member according to claim 1 wherein the antiglare light diffusing layer has surface haze of 1-15% and internal haze of 15-50%.

4. The antiglare light diffusing member according to claim 1 wherein the base material is a triacetylcellulose film.

5. The antiglare light diffusing member according to claim 1 wherein the base material is a polarizing plate.

6. The antiglare light diffusing member according to claim 1 wherein:
    the plurality of the types of particles include particles (A) and particles (B), and
    an average particle size of the particles (A) is 0.5-10 μm and the standard deviation of the particles (A) size is 40% or less of the average particles (A) size.

7. The antiglare light diffusing member according to claim 1 wherein the plurality of the types of particles include particles (A) and particles (B), and the content of the particles (A) is 5-30 wt % relative to the antiglare light diffusing layer.

8. The antiglare light diffusing member according to claim 1 wherein:
    the plurality of the types of particles include particles (A) and particles (B), and
    the particles (A) are composed of amorphous particles having a primary particle size of 0.003-0.1 μm and a secondary particle size of 0.5-2.5 μm.

9. The antiglare light diffusing member according to claim 1 wherein:
    the plurality of the types of particles include particles (A) and particles (B), and
    an average particle size of the particles (B) is 2-10 μm and the standard deviation of the particles (B) size is 15% or less of the average particles (B) size.

10. The antiglare light diffusing member according to claim 1 wherein:
    the plurality of the types of particles include particles (A) and particles (B), and
    the content of the particles (B) is 2-15 wt % relative to the antiglare light diffusing layer.

11. The antiglare light diffusing member according to claim 1 wherein:
    the plurality of the types of particles include a particles (A) and particles (B),
    the difference between the refraction index of the particle (A) and the refraction index of the binder matrix is less than 0.07, and
    the difference between the refraction index of the particle (B) and the refraction index of the binder matrix is in the range of 0.02-0.15.

12. A display having the antiglare light diffusing member according to claim 1 on the outermost surface thereof.

\* \* \* \* \*